June 19, 1951  J. G. BURMIST  2,557,173
ACCELEROMETER
Original Filed Feb. 1, 1945  3 Sheets-Sheet 1

Inventor
John G. Burmist
By
Attorney

June 19, 1951　　　　J. G. BURMIST　　　　2,557,173
ACCELEROMETER

Original Filed Feb. 1, 1945　　　　　　3 Sheets-Sheet 2

Inventor
John G. Burmist
By B. T. Wobensmith 2nd
Attorney

June 19, 1951  J. G. BURMIST  2,557,173
ACCELEROMETER
Original Filed Feb. 1, 1945  3 Sheets-Sheet 3

Inventor
John G. Burmist
By  B. T. Wobensmith 2nd
Attorney

Patented June 19, 1951

2,557,173

UNITED STATES PATENT OFFICE 2,557,173

ACCELEROMETER

John G. Burmist, Philadelphia, Pa.

Original application February 1, 1945, Serial No. 575,710, now Patent No. 2,504,644, dated April 18, 1950. Divided and this application May 4, 1949, Serial No. 91,247

5 Claims. (Cl. 264—1)

This invention relates to accelerometers and more particularly to acceleration responsive apparatus of high sensitivity. Considerable difficulty has been encountered in providing a direct reading accelerometer of high sensitivity and of a high order of accuracy. Damping of the acceleration responsive mass has been a source of trouble. The amplification of the relatively small movements of an acceleration responsive mass in such manner as to provide an indication of the acceleration of a body to be studied has presented many difficulties. With very high sensitivity an inertia or hysteresis effect has been observed which, unless obviated, may seriously interfere with the accuracy of indication.

It is the principal object of the present invention to provide an accelerometer of high accuracy and of high sensitivity which will be readily portable and which will overcome the difficulties heretofore encountered.

It is a further object of the present invention to provide for a damping effect which is the resultant or summation of a plurality of frequency effects.

It is a further object of the present invention to provide for the elimination of the inertia or hysteresis effect and thereby increase the sensitivity and accuracy of response of the accelerometer.

It is a further object of the present invention to provide an accelerometer having a sealed unit of predetermined low frequency which will not be subject to tampering or undesired misadjustment in the hands of unskilled persons.

It is a further object of the present invention to provide an accelerometer having a visual indication and a linear scale thereon.

It is a further object of the present invention to provide an accelerometer having improved amplification of the movement of the acceleration responsive mass.

Other objects of the invention will be apparent from the specification and claims.

The nature and characteristic features of the invention will be more readily understood from the following description, taken in connection with the accompanying drawings forming part hereof, in which.

It should, of course, be understood that the description and drawings herein are illustrative merely, and that various modifications and changes may be made in the structure disclosed without departing from the spirit of the invention.

Figure 1:
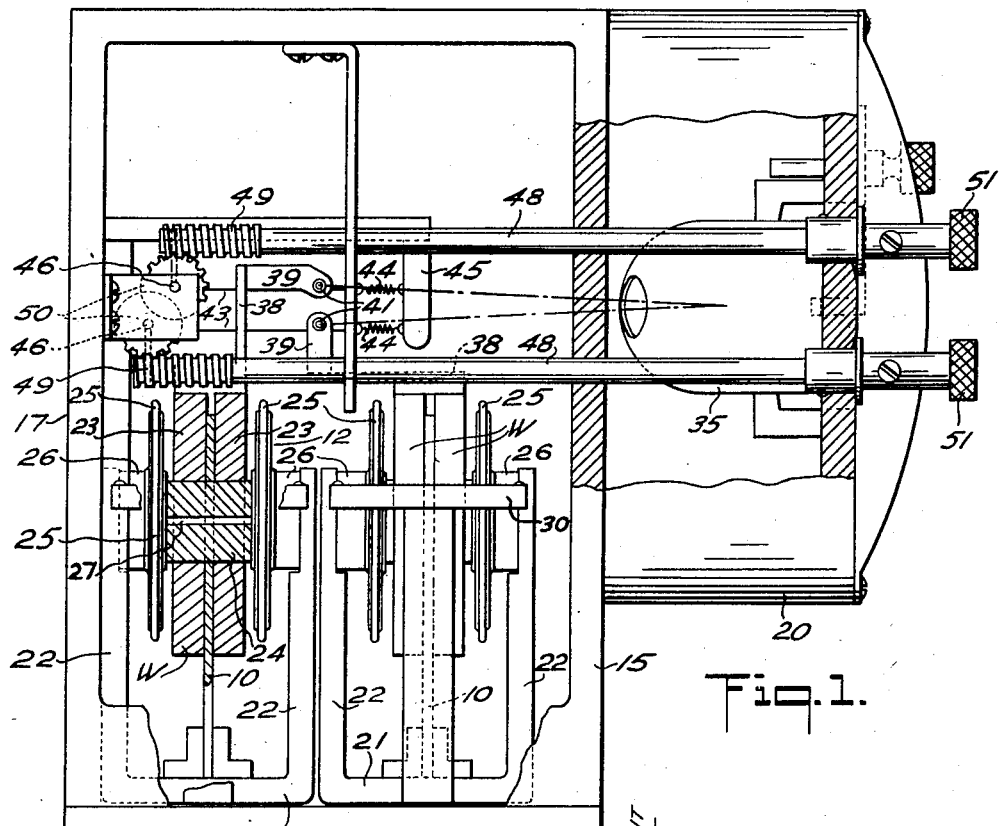
Figure 1 is a top plan view of one form of accelerometer in accordance with the present invention, parts of the housing and of the acceleration responsive element being broken away to show the details of construction.
Figure 5:
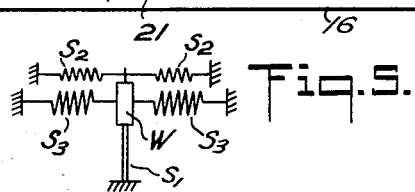
Fig. 5 is a diagrammatic view of the acceleration responsive system embodied in the accelerometer.

In accordance with the present invention an acceleration responsive weight W is provided, having a single degree of freedom, the response of the weight W to an accelerating force being modified by resilient elements having different simple harmonic frequency characteristics. This system is illustrated diagrammatically in Fig. 5 and includes the weight W mounted so as to be affected by resilient elements $S_1$, $S_2$ and $S_3$. The resilient elements may take various forms so long as they accomplish the intended purpose and various types of resilient elements are shown in the specific forms of the invention hereinafter described.

By way of illustration the resilient element $S_1$ may comprise a flat stiff cantilever spring arm 10 upon which the weight W is mounted. This portion of the system i. e. the weight W and cantilever 10, independently considered, is capable of oscillation at a particular predetermined frequency. The resilient element $S_3$ may then consist of coil springs 11, having with the weight W and independent of the other resilient elements a frequency of oscillation higher than that of the frequency of the portion of the system comprising the weight W and the cantilever arm 10, and effective on the weight W.

Figure 6:
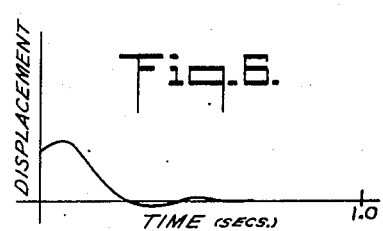
Fig. 6 is a view of displacement of the acceleration responsive mass plotted against time to illustrate the nature of the damping action.
Figure 4:
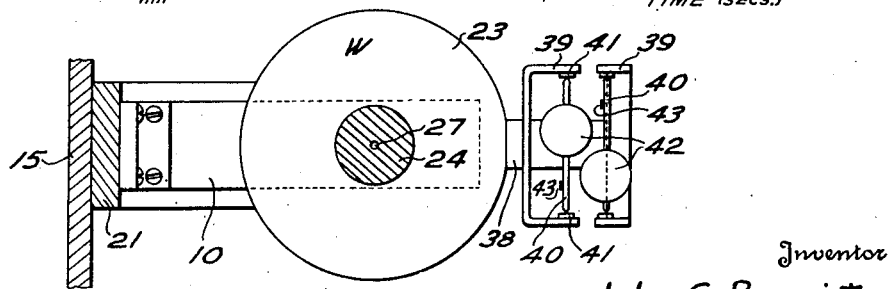
Fig. 4 is an enlarged fragmentary elevational view showing certain of the details of construction.
Figure 2:
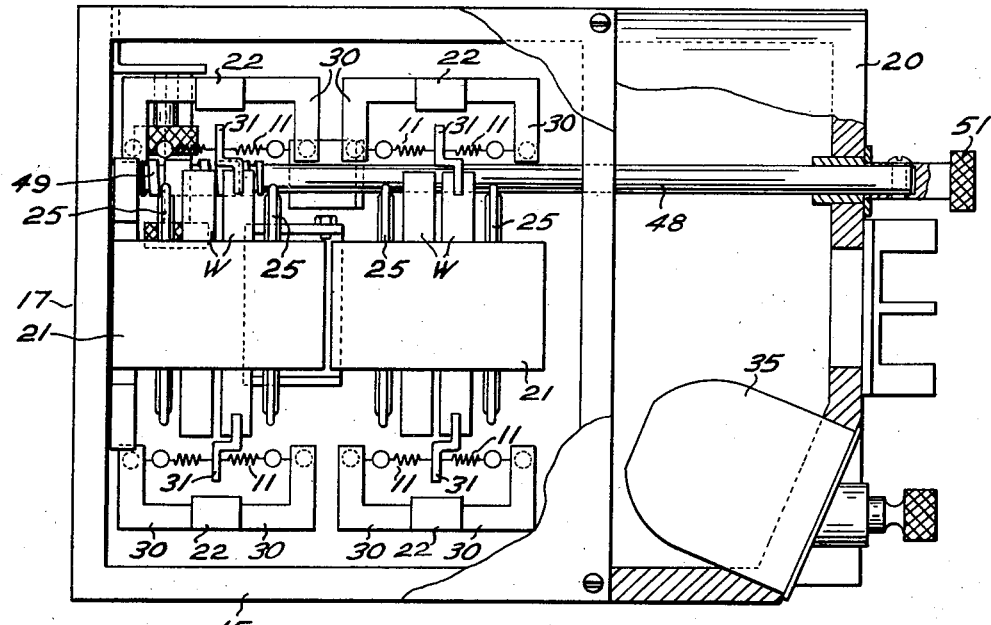
Fig. 2 is a side elevational view of the accelerometer shown in Fig. 1, parts of the housing being broken away to show the details of construction.
Figure 3:
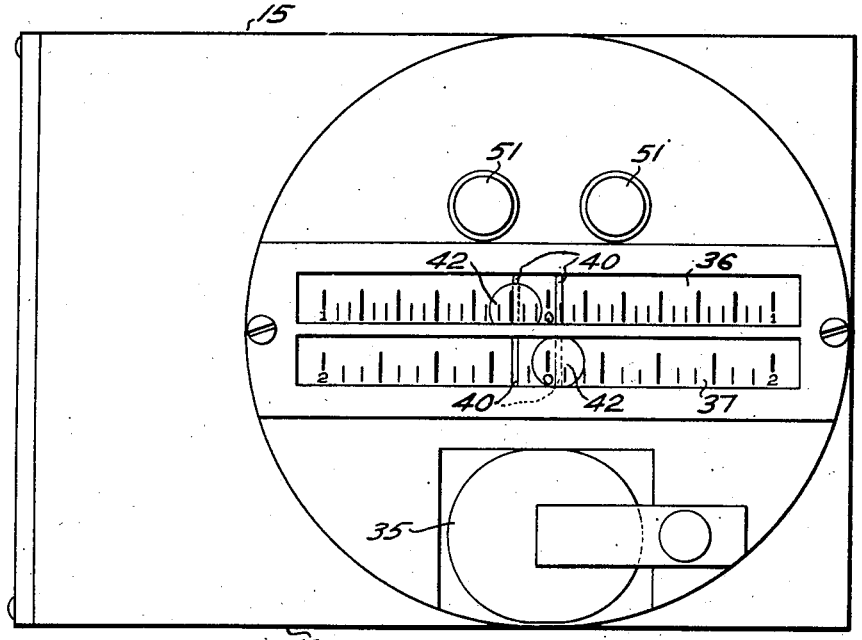
Fig. 3 is a front elevational view of the accelerometer shown in Fig. 1.

The resilient element $S_2$ may then have with the weight W, and independent of the other resilient elements, a very low frequency of oscillation. These resilient elements, in addition to their effect in the summation or resultant to give the desired forced vibration of the weight, also provide an external force for overcoming the set in the other resilient elements and the inertia of the weight W. By a proper selection of the frequency contributing characteristics of the flat spring 10, the coil spring 11, and the spring element 12 so that the frequency of the entire system approaches the natural frequency, it has been found that the displacement of the weight W when plotted against time will give a resultant curve similar to that shown in Fig. 6. This curve is apparently the resultant or summation of the frequency effects contributed by the resilient elements acting on and with the weight W.

In a preferred embodiment of the invention in form for use a portable accelerometer is provided which preferably includes an external protective and enclosing housing 15 having external plane faces 16, 17 and 18, any one of which may serve as a base or supporting face for the instrument in accordance with the plane in which it is desired to determine the accelerating force as hereinafter pointed out. The housing 15 is provided with a generally cylindrical extension 20 which carries certain portions of the control structure as hereinafter explained. Within the housing 15 frames 21 are provided each of the frames 21 preferably being of relatively high rigidity, so as to be free from distortion within the range of accelerating forces to which the accelerometer is responsive. Each of the frames 21 preferably includes a central section and a pair of rigid parallel side frame bars 22.

A plurality of acceleration responsive weights W are preferably provided, the weights W being of different values, in order that readings may be obtained over different ranges. The acceleration responsive weights W each preferably consists of a pair of circular plates or weight members 23 carried on a central portion 24, the total mass being of predetermined quantity, and supported and guided by a cantilever arm 10 of the desired stiffness or spring rate. The cantilever arms 10 are mounted on the central frame sections 21 so that the weight W is disposed between a pair of side frame bars 22. The cantilever arms 10 support the weights W and permit of movement thereof in a predetermined plane normal to the frame 21 and normal to the flat faces of the cantilever arm 10 and constrains the mass W from movement in an undesired direction, thereby providing for the determination of linear accelerations along one predetermined and selected axis.

The acceleration responsive masses each have flat flexible metallic bellows 25 on each face thereof with spacers 26 interposed between the outer faces of the bellows 25 and the side frame bars 22.

The bellows 25 are preferably fluid tight and have their interiors connected through a central opening or passageway 27 of fixed and predetermined size extending from the interior of one below 25 through the central portion 24 to the interior of the other bellows 25. The size of the passageway 27 will determine the oscillatory characteristics of the unit 12 including the bellows 25, the passageway 27 functioning as a fixed restriction by permitting controlled transfer of damping fluid from the interior of one bellows 25 to the interior of the other bellows 25. The damping fluid is preferably air, free from moisture, although any other fluid, capable of remaining in dry gaseous state throughout the range of temperature at which the instrument is operated, might be employed. The weights W being supported, guided and restrained by the cantilever arms 10 distortion of the bellows 25 is reduced to a minimum and this further contributes to the sensitivity of the instrument with freedom from the effect of other accelerations in other planes.

The coil springs 11 are preferably secured to the extensions 30 on the frame 21 and are connected to brackets 31 carried by the weights W. These springs 11 are preferably of equal strength on each side of the weights W and are placed under an initial tension to avoid any dead spot in their operation. These springs 11 not only have a frequency effect, as heretofore indicated, but also obviate any set of the other resilient elements and avoid any hysteresis effect.

The total displacement or movement of the weights W in response to an accelerating force is very small, and is linear over its range. For the purpose of observation amplifying apparatus is provided. The amplifying apparatus includes an electric lamp mounted in a lamp socket 35 carried by the housing extension 20. The lamp has a filament preferably formed in part as a straight line and providing a line source of light for reflection and transmission, as hereinafter pointed out, to the visual scales 36 and 37 mounted in the housing extension 20.

Each of the acceleration responsive masses W carries an arm 38 to which a pivot supporting arm 39 is secured. Each of the pivot supporting arms 39 has a spindle 40 mounted therein and supported in jewelled or other friction free bearings 41. The spindles 40 each have a small mirror, 42, preferably concave, mounted thereon for reflecting the image of the line filament of the lamp. The spindles 40 are positioned by means of small wires, 43, flat or round, extending therearound, the wires 43 at one end being connected to springs 44 mounted on a frame member 45, and at the other ends, upon small shafts 46 which serve as reels. The wires 43 being in effect fixed in their positions movement of the masses W will cause the spindles 40 to rotate because of their engagement with the wires 43. In order to adjust the zero positions of the mirrors 42, adjusting rods 48 are provided, extending through the end of the housing extension 20. The rods 48 have worms 49 on their inner ends for engagement with spur gears 50 carried on the shafts 46 for rotating the shafts 46. The rods 48 have operating handles 51 on their outer ends.

The scales 36 and 37 are preferably formed as transparent strips for the observation of the reflections of the light source from the mirrors 42 and may be divided or marked in any desired manner to represent accelerations in terms of the acceleration of gravity $g$, and in accordance with the acceleration responsive masses W which are employed. The scales 36 and 37 may be respectively divided into decimal parts from plus one $g$ through zero $g$ to minus one $g$, in increments of $0.02g$, and from plus $2g$ through zero $g$ to minus $2g$, in increments of $0.05g$, the positions of zero $g$ being at the center of the scales 36 and 37. If desired the instrument may be readily adapted for higher scale ranges.

In use the instrument is placed in the location where it is desired to ascertain the accelerating force, and preferably with the face 16 horizontal. Upon the application of the accelerating force of unknown magnitude within the range of the instrument to the weights W there is a tendency of the weights W to be deflected in accordance with the magnitude of the force. The resilient elements are effective on the weights W for damping, thereby preventing continued oscillation thereof. The movement of the weights W to the position determined by the accelerating force causes a movement of the spindles 40, by reason of their encircling by the wires 43, so that the light beam reflected by the mirrors 42 appear on the scales 36 and 37 for observation. The resilient elements effective on the weights W provide, within a very short interval of time, for a stabilized indication. The light beams may be readily moved to the zero position on the scales 36 and 37 by means of the adjusting handles 51 and in the event that the weight is caused to function in a vertical plane the necessary adjustment for the acceleration of gravity may be readily made.

Figure 7:
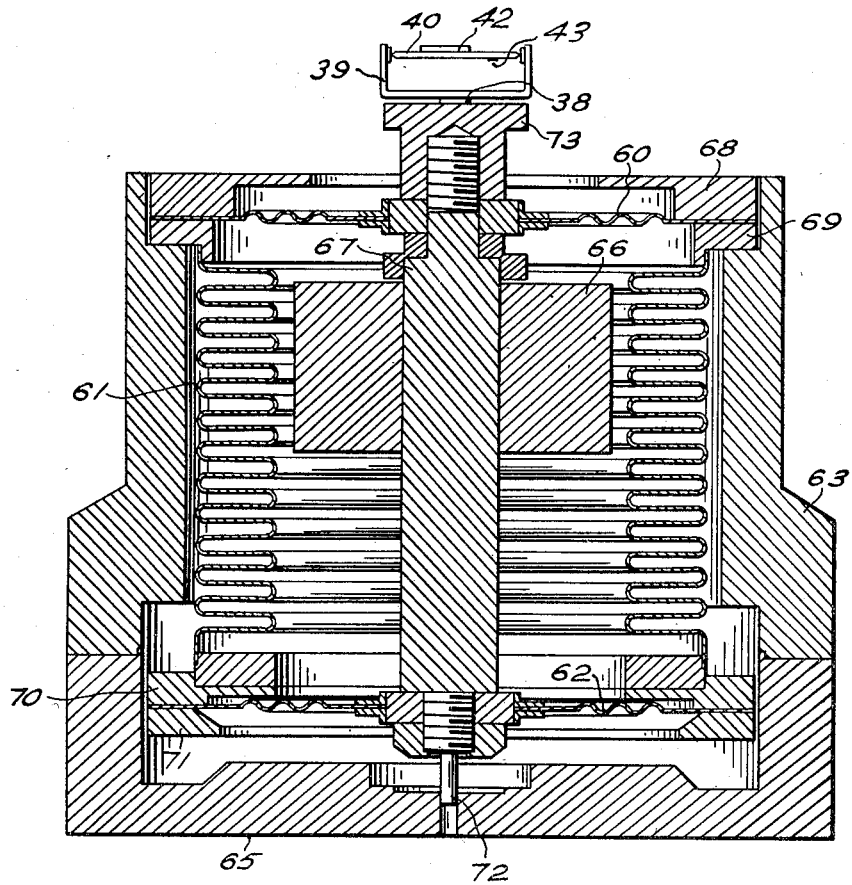
Fig. 7 is a central sectional view of another accelerometer in accordance with the present invention.

In the form of the invention illustrated in Fig. 7 the resilient element $S_1$ may comprise a metallic diaphragm 60, the resilient element $S_2$ may comprise a flexible metallic bellows 61 and the resilient element $S_3$ may comprise a metallic diaphragm 62 which is thinner and more readily flexed than the diaphragm 60.

A casing or frame 63 is provided, having a lower plane face 65 which is adapted to be positioned to serve as a base or supporting face.

The acceleration responsive weight W preferably includes a cylindrical portion 66 mounted within the casing 63, preferably upon a central member 67. The diaphragm 60 is connected, at the central part thereof, to the central member 67. The diaphragm 60 is secured at its periphery between clamping rings 68 and 69 mounted in the casing 63.

The diaphragm 62 is also connected, at the central part thereof, to the central member 67 and is secured at its periphery between clamping rings 70 and 71 which are movable with respect to the casing 63.

The metallic bellows 61 is secured at its upper end preferably to the clamping ring 69, and at its lower end to the clamping ring 70.

The central member 67 may have a guiding extension 72 at its lower end for preventing misalinement and the upper end may be provided with a cap 73 to which an arm 38 may be secured for carrying a pivot supporting arm 39 with a spindle 40 therein.

Upon the application of the accelerating force of unknown magnitude there is a tendency, as before, for the weight W to be deflected in accordance with the magnitude of the force. The resilient elements comprising in this instance the diaphragms 60 and 62 and the metallic bellows 61 are effective on the weight W for providing a stabilized indication.

This application is a division of my prior application filed February 1, 1945, Serial No. 575,710, for Accelerometers, now Patent No. 2,504,644.

I claim:

1. An accelerometer comprising a support, an acceleration responsive member movable with respect to such support, and mounting means for said responsive member for damping the movement thereof including a corrugated flexible metallic member of predetermined frequency characteristics carried by said support and having a movable portion connected to said responsive member in supporting relation, a second corrugated flexible metallic member of different predetermined frequency characteristics from said first flexible member connected to said acceleration responsive member, and a third corrugated flexible metallic member of still different predetermined frequency characteristics connected to said support at one end and connected to said second flexible member at the other end thereof, the combined frequency effects of the flexible metallic members effecting damping of movement of the acceleration responsive member.

2. An accelerometer comprising a support, an acceleration responsive member movable with respect to such support, and mounting means for said responsive member for damping the movement thereof, including a corrugated flexible metallic member of predetermined frequency characteristics carried by said support and having a movable portion connected to said responsive member in supporting relation, a second corrugated flexible metallic member of different predetermined frequency characteristics from said first flexible member connected to said acceleration responsive member, and a flexible metallic bellows of still different predetermined frequency characteristics connected to said support at one end and connected to said second flexible member at the other end thereof, the combined frequency effects of said flexible members and said bellows effecting damping of the movement of the acceleration responsive member.

3. An accelerometer comprising a support, an acceleration responsive member movable with respect to such support, and mounting means for said responsive member for damping the movement thereof including a flexible metallic diaphragm of predetermined frequency characteristics carried by said support and having a movable portion connected to said responsive member in supporting relation, a second flexible metallic diaphragm of different predetermined frequency characteristics from said first diaphragm connected to said acceleration responsive member in supporting relation, and a flexible metallic bellows of still different predetermined frequency characteristics connected to said support at one end and connected to said second diaphragm at the other end thereof, the combined frequency effects of said diaphragms and said bellows effecting damping of the acceleration responsive member.

4. An accelerometer comprising a casing, a flexible diaphragm of predetermined size and frequency characteristics rigidly connected to said casing, an acceleration responsive member connected to a movable portion of said diaphragm, a second diaphragm of different predetermined size and frequency characteristics from said first diaphragm having a movable portion connected to said acceleration responsive member for movement therewith, and a metallic bellows of still different frequency characteristics connected to said casing at one end and connected to said second diaphragm at the other end, the longitudinal axis of said acceleration responsive member passing through the central portions of said diaphragms and being coincident with the longitudinal axis of said bellows, and the combined frequency characteristics of said diaphragms and said bellows effecting damping of said acceleration responsive member.

5. An accelerometer comprising a casing, a flexible diaphragm of predetermined frequency characteristics rigidly connected to said casing, an acceleration responsive member connected to a movable portion of said diaphragm, a second diaphragm of different predetermined frequency characteristics from said first diaphragm connected ot said acceleration responsive member for movement therewith, and a metallic bellows of different frequency characteristics from said diaphragms connected to said casing at one end and connected to said second diaphragm at the other end, the longitudinal axis of said acceleration responsive member passing through the central portions of said diaphragms and being coincident with the longitudinal axis of said bellows, and the combined frequency characteristics of said diaphragms and said bellows effecting damping of said acceleration responsive member.

JOHN G. BURMIST.

REFERENCES CITED

The following references are of record in the file of this patent:

UNITED STATES PATENTS

| Number | Name | Date |
|---|---|---|
| 989,958 | Frahm | Apr. 18, 1911 |
| 1,595,225 | Coffin | Aug. 10, 1926 |
| 2,231,957 | Shrader | Feb. 18, 1941 |
| 2,237,326 | Barry | Apr. 8, 1941 |
| 2,317,028 | Chappell | Apr. 20, 1943 |
| 2,332,994 | Draper | Oct. 26, 1943 |
| 2,504,644 | Burmist | Apr. 18, 1950 |